Jan. 13, 1925.
W. G. COLES
LUBRICATOR
Filed Jan. 4, 1923
1,522,673
3 Sheets-Sheet 2
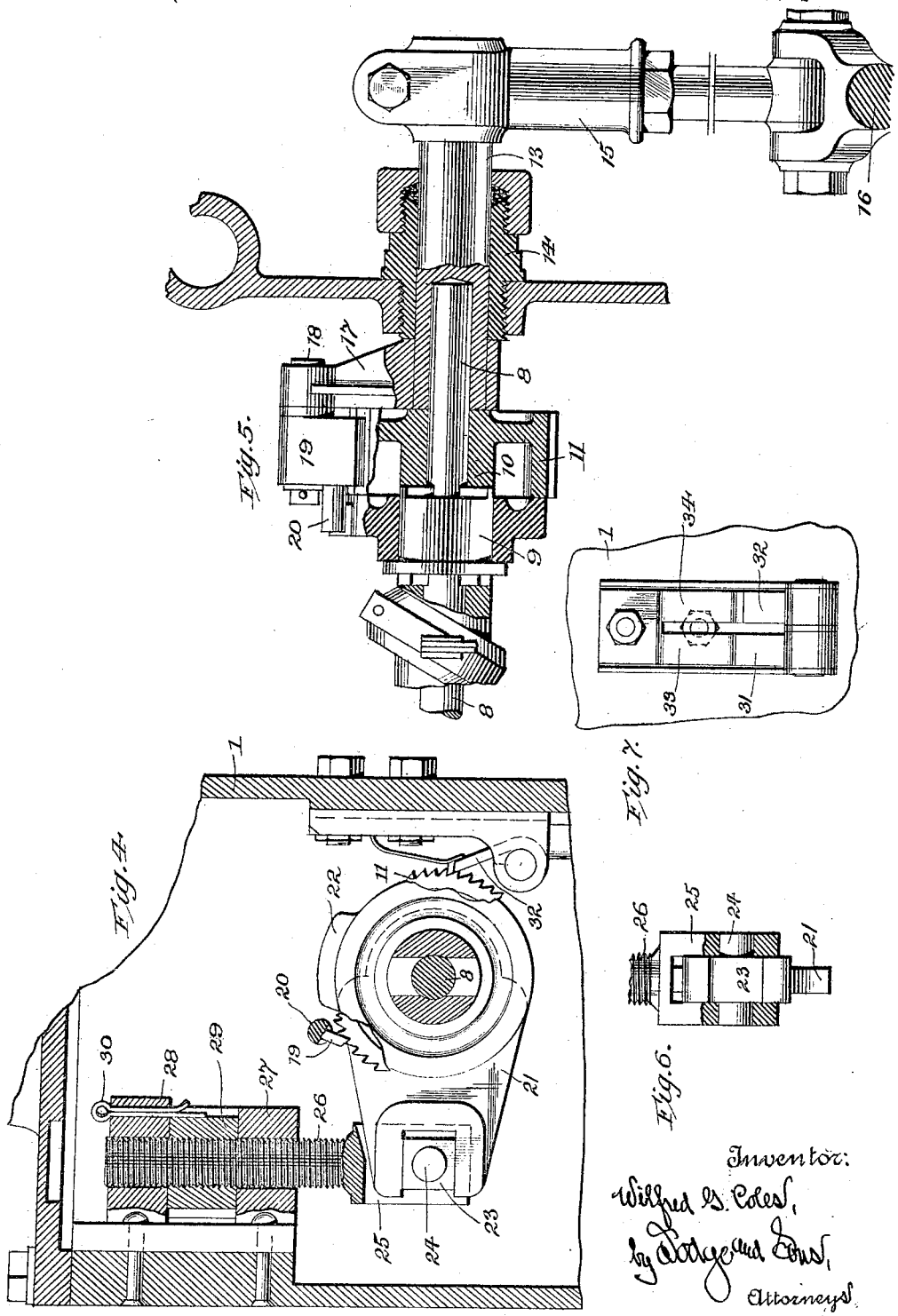

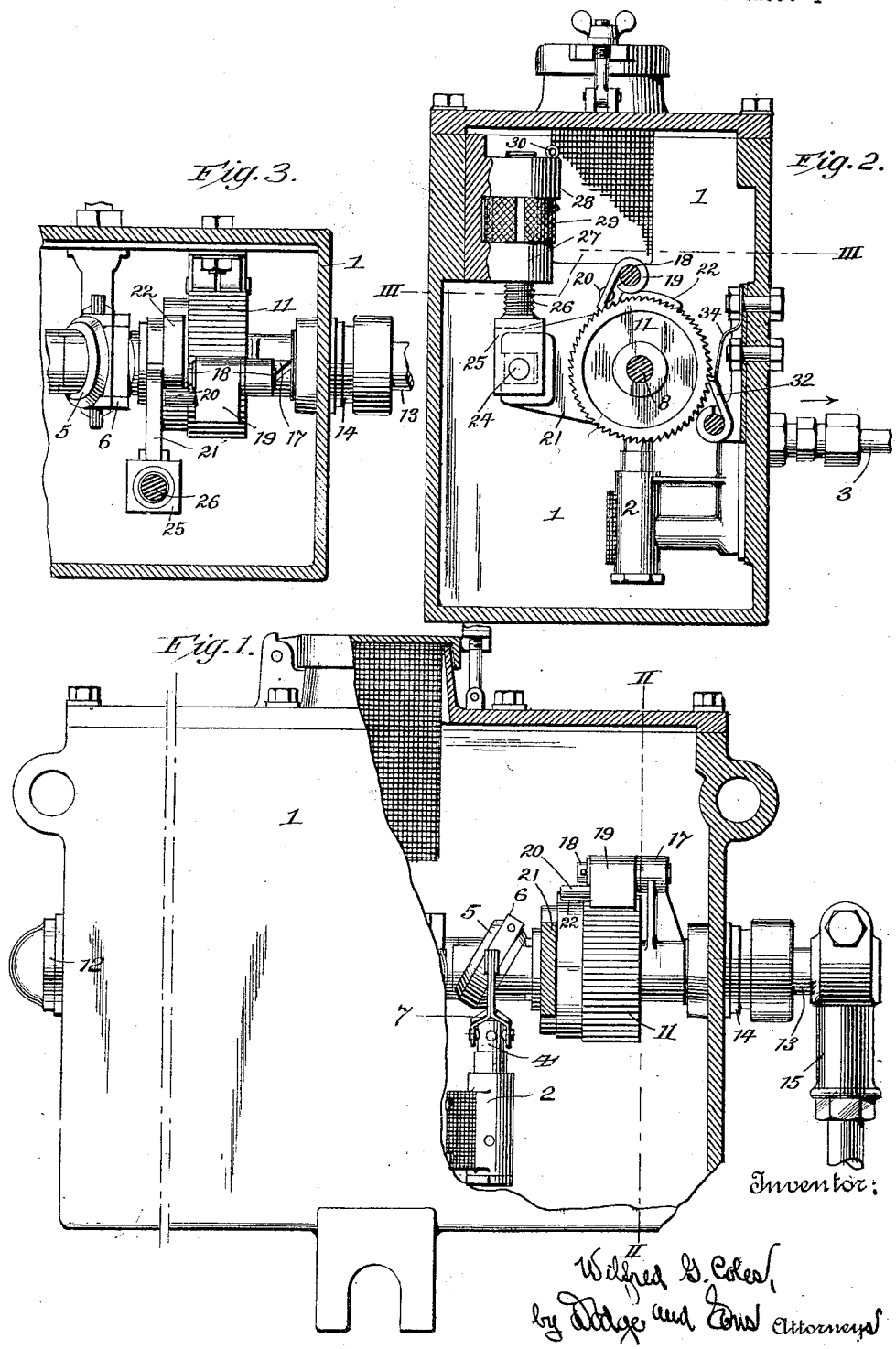

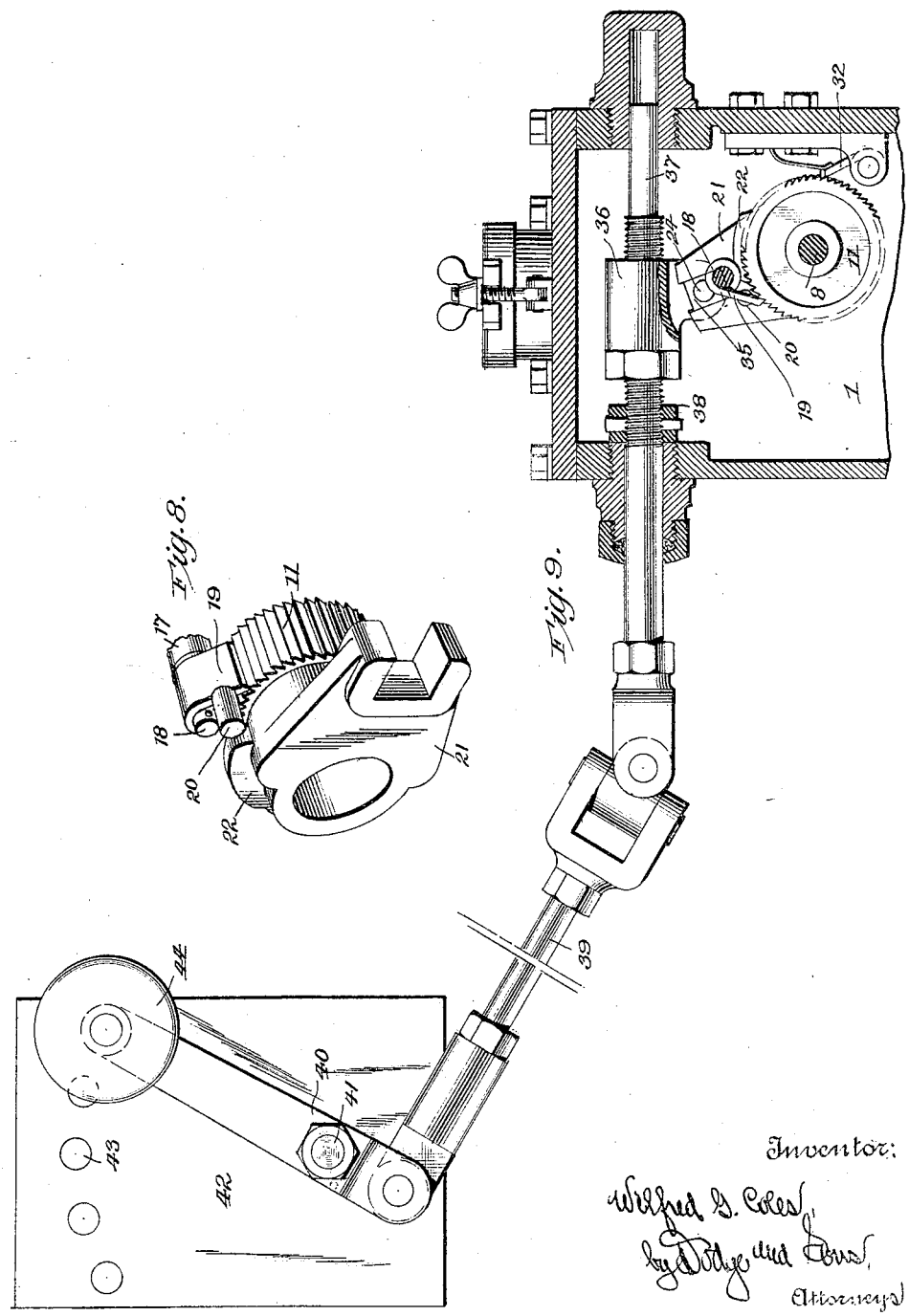

Patented Jan. 13, 1925.

1,522,673

UNITED STATES PATENT OFFICE.

WILFRED G. COLES, OF MADISON, WISCONSIN, ASSIGNOR TO MADISON-KIPP CORPORATION, OF MADISON, WISCONSIN, A CORPORATION OF WISCONSIN.

LUBRICATOR.

Application filed January 4, 1923. Serial No. 610,599.

*To all whom it may concern:*

Be it known that I, WILFRED G. COLES, a citizen of the United States, residing at Madison, in the county of Dane and State of Wisconsin, have invented certain new and useful Improvements in Lubricators, of which the following is a specification.

This invention pertains to lubricators, and more particularly the force feed type wherein provision is made for varying the quantity of oil which may be fed to one or more parts to be lubricated while the actuating mechanism maintains its full stroke or movement. The invention also offers an opportunity for eliminating many difficulties in the installation of a lubricator on an engine. For example, where the lubricator employs a ratchet drive, and in case the lubricator driving mechanism must be arranged to engage only one tooth in the ratchet wheel per stroke, without the device hereinafter described it will be necessary to install a very accurately measured drive arm on the lubricator so that the stroke of the engine would carry the ratchet pawl a distance of exactly one tooth on the ratchet wheel. Under the present structure the length of the drive arm on the lubricator need be only approximately correct, and after the installation is made through the adjusting devices hereinafter set forth, the effective stroke of the ratchet pawl can be quickly regulated.

Two embodiments of the invention are shown in the annexed drawings, wherein,—

Fig. 1 is a side elevation of a lubricator with the casing broken away in part to show portions of the operative mechanism;

Fig. 2 a transverse vertical sectional view, taken on the line II—II of Fig. 1;

Fig. 3 a transverse horizontal sectional view, taken on the line III—III of Fig. 2;

Fig. 4 a detail vertical sectional view on a somewhat enlarged scale, illustrative of the ratchet and pawl mechanism and the pawl lifter or ratchet shroud, with the means employed for adjusting the same;

Fig. 5 a longitudinal sectional view showing the manner in which the ratchet wheel and its allied parts are mounted and operated;

Fig. 6 a detail view, partly in section, showing the connection between the lifter carrier and its adjusting screw or member;

Fig. 7 a face view of the dual locking pawls employed in conjunction with the ratchet;

Fig. 8 a perspective view of the ratchet, the actuating pawl, and the adjustable actuating pawl lifter; and Fig. 9 a sectional elevational showing a modification of the invention whereby the movement of the ratchet wheel which is connected with the operating shaft of the lubricator pump may be adjusted from without the lubricator.

In the operation of locomotives or other vehicles which have to negotiate grades, it is essential to a proper lubrication of the parts, that a greater amount of lubricant be forced or fed thereto when the vehicle or engine is moving up grade. The present invention admits of such adjustment of the lubricator or the lubricator pumps as will permit this greater degree of lubrication to be readily effected.

Referring first to Figs. 1 to 8 inclusive, 1 denotes a reservoir adapted to contain the oil to be pumped to the parts to be lubricated, in which there is mounted a series of pump elements, indicated by 2, with which are connected delivery pipes 3 leading to the parts to be lubricated. Said pumps may be of any approved type, and in the instant case are shown as having reciprocating plungers 4 to which reciprocating motion, as well as an oscillating movement, is imparted through a wabbling eccentric 5 which is connected with the piston through a strap 6 and a yoke 7. Said pumps may be of the type shown in Letters Patent No. 796,659, Kipp, August 8, 1905.

The eccentrics, there being one for each pump unit, are mounted for rotation upon a shaft 8, and the hubs of such eccentrics are provided with interlocking parts which engage each other, and the one at the right (see more particularly Fig. 5) is interlocked with the bushing or collar 9 to which is similarly interlocked a hub 10 of a ratchet wheel 11. One end of the shaft 8 finds its support in a bearing 12 (Fig. 1) while the opposite end (see Fig. 5) extends into an opening formed in a stub shaft 13 mounted in a suitable bearing 14 secured in the wall of the housing. To the outer end of the shaft 13 there is secured a rocker arm 15, adapted to be operated through a link 16 connected up with a moving part of the engine or machine to be lubricated. In this manner an oscillating movement is imparted to the shaft 13 and to the pawl carrier 17, the hub whereof is securely affixed to the inner end of the shaft 13, as for instance, by a driving fit effected between the parts. It will therefore be seen that the pawl carrier 17 partakes of the oscillating movement imparted to the shaft 13 through the lever 15 and link 16.

In the upper end of the pawl carrier is secured a pin 18 upon which is pivotally mounted an actuating pawl 19, said pawl being provided with a laterally extending finger or lug 20. Mounted for rotation upon the bushing or hub 9 is an arm 21 provided with a laterally extending concentric projection or lifting member 22 which stands in line with the laterally projecting finger or arm 20 of the actuating pawl 19. The outer face of such lifting member 22, as will be seen more particularly upon reference to Figs. 2, 4 and 8, extends outwardly in a radial direction to a greater extent than the diameter of the ratchet wheel 11, so that when the arm 20 passes on to said lifter member 22, the pawl 19 will be moved upwardly and out of the path of engagement with the teeth of the ratchet. Thus by shifting the member 21 and bringing the member 22 into one or another position with relation to the arm 20, the pawl 19 may be kept out of engagement with the teeth of the ratchet to a greater or less extent of the movement of said ratchet as it is moved forwardly by the carrier 17. So long as the pin or arm 20 rides upon the lifter 22 the pawl 19 will be held out of engagement, and as a consequence no motion will be imparted to the ratchet wheel, and it follows that no motion will be imparted to the hub or bushing 9 and to the various eccentrics which actuate the pump pistons. By shifting the member 21, the pawl may be caused to engage a greater or less number of teeth and the movement of the ratchet and its allied parts consequently varied.

To adjust the lifter arm 21 the following means may be employed. The outer end of the arm 21 is bifurcated and in such portion I mount a block 23 (Figs. 4 and 6) through which block is passed a pin 24, said pin finding its bearings in the bifurcated end 25 of a screw threaded shaft or bolt 26. Said element 26 passes freely through a pair of spaced lugs 27 and 28 and a nut 29 threaded upon the shaft is held between said lugs. By raising or lowering the member 26 the position of the member 21, and consequently the position of the lifter 22, may be varied, as desired. By raising the member 26 the lifter 22 will be moved rearwardly or to the right (Fig. 4) and, as a consequence, the actuating pawl 19 will immediately engage the teeth of the ratchet, the moment the rocker 17 begins to swing forwardly. It follows therefore that the ratchet wheel and its allied parts will be given a large amplitude of movement. If the arm 21 is dropped or moved downwardly, the lifter 22 will be moved to the left, or counter-clockwise, and the actuating pawl 19 will continue to ride thereover during a greater or less portion of its movement, and it will engage the ratchet at a later period in its movement and move said ratchet a lesser distance than under the adjustment first noted. Thus the various pump elements will be operated to a greater or less extent and as a consequence a greater or less amount of lubricant will be forced to the parts to be lubricated. The nut 29 may be locked in the desired adjusted position by a cotter pin 30. To prevent retrograde movement of the ratchet wheel, I preferably employ two locking pawls 31 and 32, one of which is slightly longer than the other, said pawls being held in working relation to the teeth of the ratchet wheel by spring fingers 33 and 34. The difference in the length of these locking pawls is substantially equal to half of the length of one of the teeth, as will be best seen upon reference to Fig. 4. One or the other of the pawls will, therefore, always be in engagement with the ratchet teeth and proper functioning of the parts is thereby insured.

It is conceivable that the adjustment of the lifter carrying element 21 may be effected from without the housing or reservoir 1, so that when the vehicle or engine is moving up-grade the adjustment to permit of a greater amount of oil being fed, may be readily controlled. Thus in Fig. 9 the lifter control element 21 is shown as movable to bring it to any desired adjustment by means of a block 35 mounted in its bifurcated end, which block is pin jointed to a collar 36 threaded for adjustment upon a longitudinally movable shaft or rod 37. Said rod likewise carries a stop collar 38 which prevents the parts from being moved beyond a predetermined distance when moved in one direction, the opposite end of the shaft performing the same function when it is moved in the other direction. By shifting the shaft 37 the desired adjustment of the pawl lifter may be had, and such adjustment may be effected through a link 39 connected at one end to the shaft 37 and at its opposite end to one end of a lever 40 fulcrumed at 41 upon any suitable fixed support, as, for instance, a panel member 42 in which are formed a series of openings 43 adapted to cooperate with a retractile stop or pin 44 carried at the upper end of the lever 40. By taking hold of the outer engaging end of the stop 44 and pulling it outwardly, the lever 40 may be swung to the desired point of adjustment and then locked in position.

What is claimed is,—

1. In a force feed lubricator, the combination of a reservoir; a pumping unit mounted therein; a shaft mounted in the wall of the reservoir; means for imparting an oscillating movement to said shaft; a second shaft extending through the reservoir, one end of said shaft extending into an opening formed in the first mentioned shaft; a bearing for the opposite end of said second shaft; a ratchet mounted for rotation upon the second shaft; driving connections interposed between said ratchet and the pump unit; a pawl carrier secured to the inner end of the first mentioned shaft; a pawl carried thereby and normally engaging the teeth of the ratchet; and adjustable means under the control of the operator for raising the pawl and holding it raised out of engagement with the teeth of the ratchet for a greater or less extent of movement of the pawl carrier.

2. In a force feed lubricator the combination of a reservoir; a pumping unit mounted therein; a ratchet wheel associated with said pumping element to drive the same; an oscillating pawl carrier; an actuating pawl mounted thereon and adapted to engage the ratchet; a pair of locking pawls likewise engaging the ratchet, one of said pawls being longer than the other; means for forcing said locking pawls into engagement with the ratchet; and means under the control of the operator for lifting the actuating pawl and holding the same out of engagement with the ratchet to a greater or less extent of the movement of the pawl carrier.

In testimony whereof I have signed my name to this specification.

WILFRED G. COLES.